(12) United States Patent
Hahnlen et al.

(10) Patent No.: US 11,724,334 B2
(45) Date of Patent: Aug. 15, 2023

(54) CONTINUOUS ULTRASONIC ADDITIVE MANUFACTURING

(71) Applicants: HONDA MOTOR CO., LTD., Tokyo (JP); OHIO STATE INNOVATION FOUNDATION, Columbus, OH (US)

(72) Inventors: Ryan Hahnlen, Dublin, OH (US); Marcelo Dapino, Columbus, OH (US); Leon Headings, Columbus, OH (US); Mark Bryant Gingerich, Columbus, OH (US)

(73) Assignees: HONDA MOTOR CO., LTD., Tokyo (JP); OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 17/692,735

(22) Filed: Mar. 11, 2022

(65) Prior Publication Data

US 2022/0193813 A1   Jun. 23, 2022

Related U.S. Application Data (62) Division of application No. 16/156,532, filed on Oct. 10, 2018, now Pat. No. 11,298,775.
(Continued)

(51) Int. Cl.
*B23K 20/00* (2006.01)
*B23K 20/10* (2006.01)
(Continued)

(52) U.S. Cl.
CPC .............. *B23K 20/10* (2013.01); *B22F 12/86* (2021.01); *B23K 20/103* (2013.01); *B23K 20/26* (2013.01); *B23K 37/04* (2013.01)

(58) Field of Classification Search
CPC ...... B23K 20/10; B23K 20/103; B23K 20/22; B23K 20/26; B23K 2101/18; B23K 2103/16; B23K 37/04
See application file for complete search history.

(56) References Cited

U.S. PATENT DOCUMENTS 1,966,708 A  *  7/1934  Burgund .................. B44C 7/04
                                                  118/235
3,217,957 A     11/1965  Jarvie et al.
(Continued)

FOREIGN PATENT DOCUMENTS

CN          1646315 A      7/2005
CN       101068005 A      11/2007
(Continued)

OTHER PUBLICATIONS

Communication dated Sep. 28, 2022, from the State Intellectual Property Office of People's Republic of China in Application No. 201910419350.4.
(Continued)

*Primary Examiner* — Erin B Saad
(74) *Attorney, Agent, or Firm* — ArentFox Schiff LLP (57) ABSTRACT

According to one aspect, the present disclosure provides a system for manufacturing transition structures including fiber threads embedded within a metal component. The system may include a supply of base sheet metal. The system may include a conveyor supported on a plurality of rollers and configured to move the base sheet metal in a production direction. The system may include a plurality of stages arranged in the production direction. Each stage may include a channel forming device configured to form a channel in the base sheet metal, a fiber inserting device configured to insert a portion of a fiber material into the channel, and one or more ultrasonic welders configured to consolidate a layer of
(Continued)

metal foil over the fiber. The disclosure includes methods of using the system to produce transition structures and reinforced components.

7 Claims, 9 Drawing Sheets

Related U.S. Application Data (60) Provisional application No. 62/676,191, filed on May 24, 2018.

(51) Int. Cl.
*B23K 20/26* (2006.01)
*B23K 37/04* (2006.01)
*B22F 12/86* (2021.01)

(56) References Cited

U.S. PATENT DOCUMENTS

| | | |
|---|---|---|
| 4,414,045 A | 11/1983 | Wang et al. |
| 4,878,971 A | 11/1989 | Tsunekawa et al. |
| 6,149,755 A | 11/2000 | McNichols et al. |
| 8,425,708 B2 | 4/2013 | Rubin et al. |
| 9,414,501 B2 | 8/2016 | Wicker et al. |
| 10,421,496 B2 | 9/2019 | Swayne et al. |
| 10,532,421 B2 | 1/2020 | Hahnlen et al. |
| 10,661,838 B2 | 5/2020 | Sheldon et al. |
| 10,870,166 B2 | 12/2020 | Hahnlen |
| 2008/0217379 A1 | 9/2008 | Abramovici et al. |
| 2011/0143161 A1 | 6/2011 | Schroth et al. |
| 2012/0186719 A1 | 7/2012 | Van Den Aker |
| 2015/0088137 A1* | 3/2015 | Manna ............... A61B 17/142 606/79 |
| 2016/0311051 A1 | 10/2016 | Nordman |
| 2017/0050423 A1 | 2/2017 | Yamamoto et al. |
| 2017/0291253 A1 | 10/2017 | Hahnlen et al. |
| 2017/0305129 A1 | 10/2017 | Oorui et al. |
| 2019/0047031 A1 | 2/2019 | Hahnlen et al. |
| 2020/0130323 A1 | 4/2020 | Hahnlen |
| 2021/0061367 A1 | 3/2021 | Hahnlen et al. |

FOREIGN PATENT DOCUMENTS

| | | |
|---|---|---|
| CN | 102501006 A | 6/2012 |
| CN | 103600166 A | 2/2014 |
| CN | 203636197 U | 6/2014 |
| CN | 105611770 A | 5/2016 |
| CN | 106456383 A | 2/2017 |
| CN | 207431510 U | 6/2018 |
| DE | 1922840 A1 | 5/1970 |
| DE | 199 06 873 A1 | 8/2000 |
| JP | 2003-053891 A | 2/2003 |

OTHER PUBLICATIONS

Communication dated Jun. 2, 2021, issued by the German Patent Office in counterpart German Application No. 10 2019 207 562.2.
Communication dated Apr. 2, 2022, from the State Intellectual Property Office of People's Republic of China in Application No. 201910419350.4.

* cited by examiner

CONTINUOUS ULTRASONIC ADDITIVE MANUFACTURING

CLAIM OF PRIORITY UNDER 35 U.S.C. § 119

The present application for patent is a divisional of U.S. patent application Ser. No. 16/156,532 entitled "CONTINUOUS ULTRASONIC ADDITIVE MANUFACTURING" filed Oct. 10, 2018, which claims priority to Provisional Application No. 62/676,191 entitled "CONTINUOUS ULTRASONIC ADDITIVE MANUFACTURING" filed May 24, 2018, both of which are assigned to the assignees hereof, and incorporated herein by reference in their entirety.

BACKGROUND

Composite materials such as carbon fiber reinforced polymers offer a high strength or stiffness to weight ratio and may be used to replace traditional metal components in a variety of applications, such as automotive and aerospace. Metals, however, may be preferred for other components within the same application. Accordingly, there is a need to join composite components to metal components.

Traditional methods of joining composite components to metal components use a combination of adhesive and mechanical joining techniques. For example, an adhesive is used to bind the polymer to the metal, then a mechanical fastener is driven through the composite component and the mechanical component. Such traditional methods may damage the reinforcing material and create joints that are weaker than the components. For example, where continuous fiber materials are used, a mechanical fastener may break the continuous fibers, creating a point of weakness.

In view of the foregoing, there is a need for improvements to techniques for joining metals and continuous fiber materials. In particular, techniques that enable efficient production may be desirable. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect, the present disclosure provides a system for manufacturing transition structures including fiber threads embedded within a metal component. The system may include a supply of base sheet metal. The system may include a conveyor supported on a plurality of rollers and configured to move the base sheet metal in a production direction. The system may include a plurality of stages arranged in the production direction. Each stage may include a channel forming device configured to form a channel in the base sheet metal, a fiber inserting device configured to insert a portion of a fiber material into the channel, and one or more ultrasonic welders configured to consolidate a layer of metal foil over the fiber.

According to another aspect, the present disclosure provides a method of manufacturing transition structures including fiber threads embedded within a metal component. The method may include receiving a base metallic layer at a conveyor. The method may include forming a channel in the base metallic layer. The method may include inserting a portion of a fiber material into the channel. The method may include receiving a metallic foil at each of a plurality of ultrasonic weld heads along the conveyor. The method may include ultrasonically welding the metallic foil to the base metallic layer at each of the plurality of ultrasonic weld heads to form a new base metallic layer enclosing the portion of fiber material in the channel. The method may include advancing the base metallic layer along the conveyor.

According to another aspect, the present disclosure provides a method of manufacturing components reinforced with metal. The method may include receiving a base material at a conveyor. The method may include receiving a reinforcement material at each of a plurality of ultrasonic weld heads along the conveyor. The method may include ultrasonically welding the reinforcement material to a reinforced portion of the base material at each of the plurality of ultrasonic weld heads. The method may include advancing the reinforced portion of the base material along the conveyor.

In another aspect, a transition structure, includes a metallic portion and a multi-layer fiber portion including a plurality of tows embedded within the metallic portion at different layers and extending out from the metallic portion forming a fabric.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, bicycles, motorcycles, scooters, boats, personal watercraft, submersibles, canoes, rowboats, aircraft, and spacecraft. In some cases, a motor vehicle includes one or more engines.

Generally described, the present disclosure provides systems and methods for performing ultrasonic additive manufacturing (UAM) in a continuous process to improve efficiency for large scale manufacturing. Example products include a UAM transition structure that includes fiber materials embedded within a metal body and extending out of the metal body. Example UAM transition structures are described in U.S. patent application Ser. No. 15/479,953, filed Apr. 5, 2017, which is hereby incorporated by reference. Another example product includes a UAM reinforced component, in which layers of metal are ultrasonically welded to reinforced portions of the component.

Figure 1:
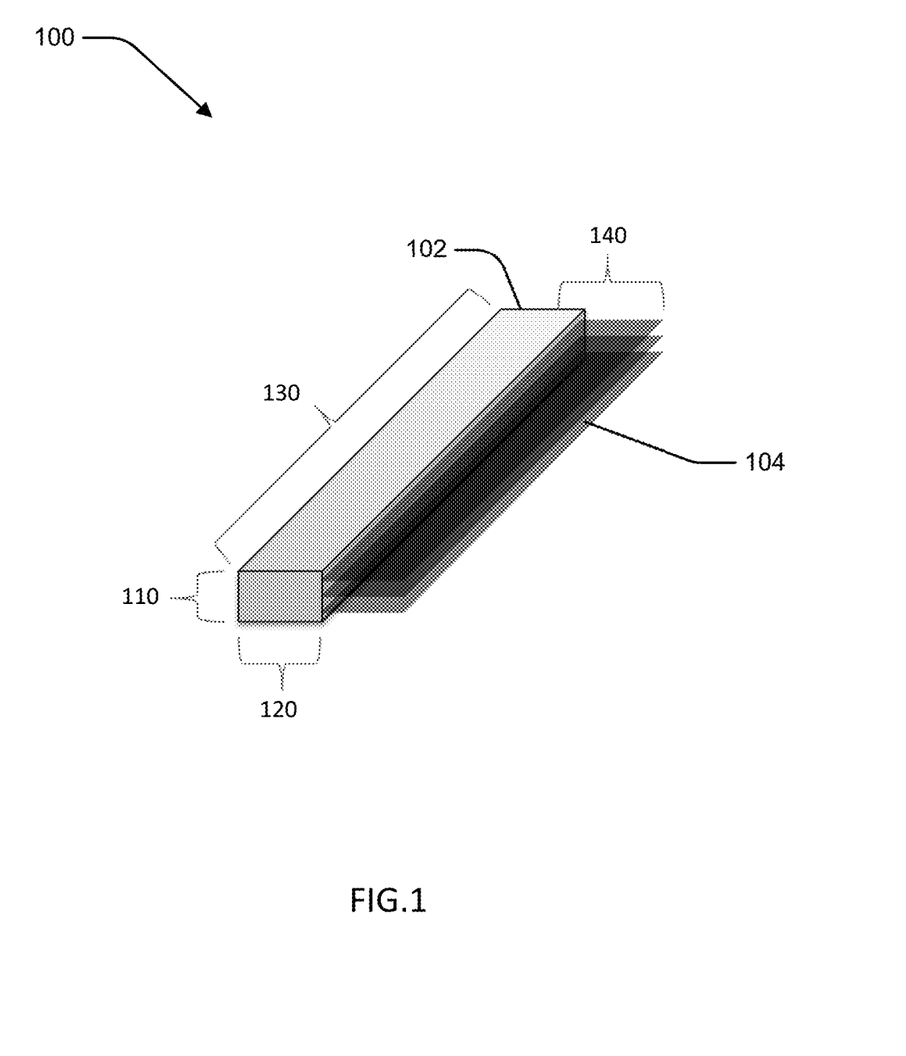
FIG. 1 illustrates an example transition structure according to an aspect of the disclosure.

Turning to the figures, where like reference numbers refer to like components, FIG. 1 illustrates an example transition structure 100 including a metallic portion 102 and a fiber composite portion 104. The metallic portion 102 may be formed of any metal or combination of metals compatible with the techniques disclosed herein. For example, the metallic portion 102 may be formed of steel, aluminum, magnesium, titanium, cobalt, beryllium, nickel, columbium, tantalum, tungsten, and alloys thereof, or other structural alloys. The fiber composite portion 104 may include one or more layers of fiber tows or fiber sheets. For example, fiber tows may include bundles of carbon fibers, glass fibers, aramid fibers, other high performance synthetic fibers, and/or natural or biological fibers. The fiber tows may be woven to form a mat or fabric. In an aspect, an edge of a fiber fabric may include fiber tows that form loops along an edge of the fiber fabric. The loops may be embedded within the metallic portion 102 and the remainder of the fiber fabric may extend out of the metallic portion 102 to form the fiber composite portion 104.

In an aspect, the metallic portion 102 may have dimensions that affect manufacturing systems and methods. The metallic portion 102 may have a thickness 110. The thickness 110 may be related to a thickness and number of layers of metallic foil that are ultrasonically welded. The metallic portion 102 may have a width 120. In an aspect, an ultrasonic welding apparatus may have a defined maximum width. For example, a UAM apparatus may have a maximum width of 1 inch or approximately 25 mm for a tape to be consolidated in a layer. In an aspect, the metallic portion 102 may have a width 120 that is limited to the maximum width of a UAM apparatus. In another aspect, multiple UAM heads may be arranged to consolidate parallel tapes to produce a width 120 greater than a maximum width of a single UAM head. In another aspect, a single spool located before a first UAM head may deposit a wide tape (e.g., 50 mm-100 mm) and multiple UAM heads may consolidate the wide tape to the metallic portion 102 having a width greater than a single UAM head. The tape may be secured by vacuum pressure, a magnetic field, or mechanical clamps between being deposited and being consolidated. The metallic portion 102 may have a length 130. The length 130 may be selected based on the needs of the transition structure 100.

Figure 2:
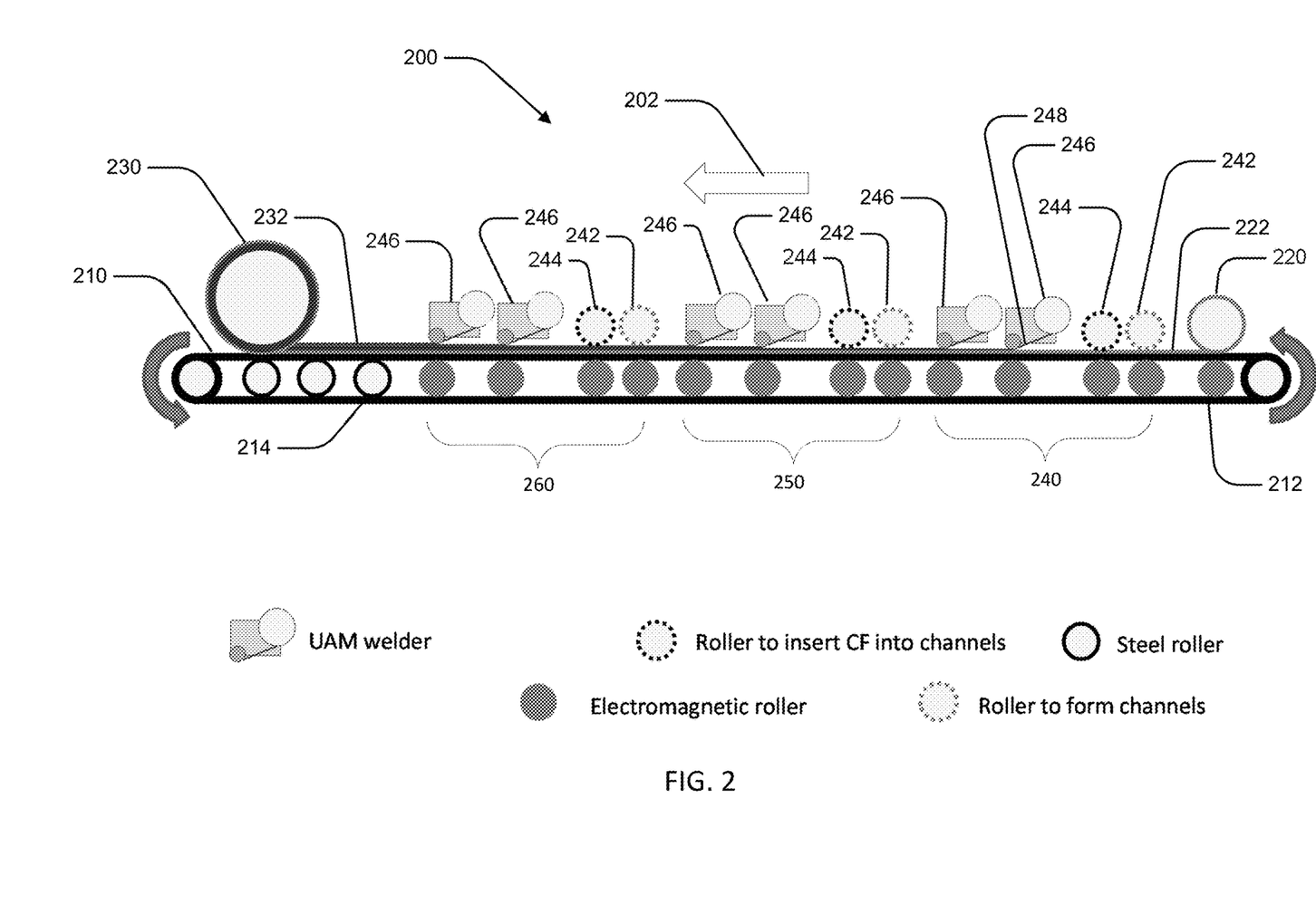
FIG. 2 illustrates an example system for continuously manufacturing transition structures, according to an aspect of the disclosure.

FIG. 2 illustrates an example system 200 for manufacturing UAM products. The system 200 may include a conveyor 210, a supply 220 of a base material 222, and a collection device 230. The conveyor 210 may include one or more devices for moving a product in a production direction 202. For example, as illustrated, the conveyor 210 may be a conveyor belt. The conveyor belt may be supported on a plurality of rollers. The rollers may include electromagnetic rollers 212 and/or steel rollers 214. The electromagnetic rollers 212 may advance the conveyor 210 in the production direction. The electromagnetic rollers 212 may also attract the base material 222 and prevent the base material 222 from moving while an operation is performed on the base material. Steel rollers 214 may provide mechanical support to the base material 222 and works in progress. In an aspect, a roller 212, 214 may be positioned at each location where an operation is performed on the base material 222. In an aspect, the rollers 212, 214 may have flat surfaces to provide support or pressure for performing an operation. As discussed in further detail below, the conveyor 210 may be discontinuous at a location where an operation is performed. For example, an ultrasonic welding device may receive the base material 222 from a first portion of the conveyor and deposit a reinforced material on a second portion of the conveyor. Although a conveyor belt is illustrated, it should be appreciated that the conveyor 210 may include other techniques for moving a base material. For example, the conveyor 210 may utilize mechanical action of a UAM head or other machine operating on the base material to move the base material. Additionally, tension may be applied to previously completed portions of the base material to pull the base material in the production direction 202. Conversely, pressure may be applied to the base material 222 by the base material supply 220 to push the base material 222 in the production direction 202. The base material may also be moved magnetically or using pick-and-place techniques involving robotic arms with material appropriate end effectors.

The supply 220 of base material 222 may be any dispenser or form factor of the base material 222. In an aspect, the base material 222 is a metallic sheet, which may be provided as a roll, tape, foil, individual sheet, bar stock, or extrusion product. The base material supply 220 may dispense the base material onto the conveyor 210 as a continuous sheet or as periodic discrete sheets.

The collection device 230 may be any device for collecting completed products 232. In an aspect, the collection device 230 may be a spool that collects the base material 222 including the UAM transitions or UAM reinforcements added thereto. In another aspect, the completed products 232 may be separated near the end of the conveyor 210 and packaged into containers or transferred to another conveyor.

The system 200 may include various machines that perform operations on the base material 222 or UAM products in progress. The machines may be organized into stages 240, 250, 260, which may include repeated machines that perform similar operations. For example, a first stage 240 may include a channel forming device 242. In an aspect, the channel forming device 242 may include a roller that forms a channel in the base material 222. The channel forming device 242 may also include a cutter, laser, or other channel forming device. The first stage 240 may also include a fiber insertion device 244. The fiber insertion device 244 may be, for example, a roller that transfers a supply of fiber to the base material 222, and in particular, to the channels formed in the base material 222. The first stage 240 may also include one or more ultrasonic welding devices 246. Each ultrasonic welding device 246 may consolidate a tape of metallic foil 248 to the base material 222. In an aspect, an ultrasonic welding device 246 may remain stationary as the base material 222 passes under the ultrasonic welding device 246 on the conveyor 210. The ultrasonic welding device 246 may vibrate at a high frequency to weld the tape of metallic foil 248 to the metallic base material 222. As illustrated, multiple ultrasonic welding devices 246 may be arranged sequentially within a stage to build up layers of metallic foil 248 while moving the base material 222 in the production direction 202.

For the transition structure 100 illustrated in FIG. 1, the system 200 may include three stages 240, 250, 260. Each stage 240, 250, 260 may be similar to stage 240 and include a channel forming device 242, fiber insertion device 244, and one or more ultrasonic welding devices 246. Accordingly, the example system 200 may produce the example transition structure 100 including three embedded layers of fiber.

The system 200 may include additional machines for performing other operations on the transition structure 100. For example, the system 200 may include one or more computer numeric control (CNC) machines for machining channels or other features, forming systems for creating features in consolidated or stock material, cutting or blanking elements, lasers, heating and/or cooling device, adhesive masking, application, and cleaning systems, coating masking, application, and cleaning systems, vacuums, blowers, electric and/or magnetic field generators, additional welding or joining systems, and feeding mechanisms for continuous or discontinuous stock material.

Additionally, a continuous UAM process may include periodic or interrupted movement. For example, the conveyor 210 may advance the base material 222 in the production direction 202, pause while one or more operations are performed, then advance the base material 222 further in the production direction.

In an aspect, certain machines may present difficulties for continuous manufacturing. For example, a conventional ultrasonic welding device may include a baseplate that retains the workpiece that is being ultrasonically welded. The baseplate may be moved back and forth beneath the sonotrode to weld multiple layers of foil at the desired locations. A continuous operation may utilize multiple ultrasonic weld heads to increase the speed at which layers can be welded and increase the number of workpieces being concurrently manufactured by removing the need for backwards movement of the workpiece relative to the sonotrodes where multiple layers are required. Positioning a workpiece in a baseplate during a continuous operation, however, may be difficult. Additionally, ultrasonic welding may fuse the workpiece to the conveyor system if care is not taken to isolate the workpiece. Accordingly, one or more parts of the system may be adapted to continuous manufacturing.

Figure 3:
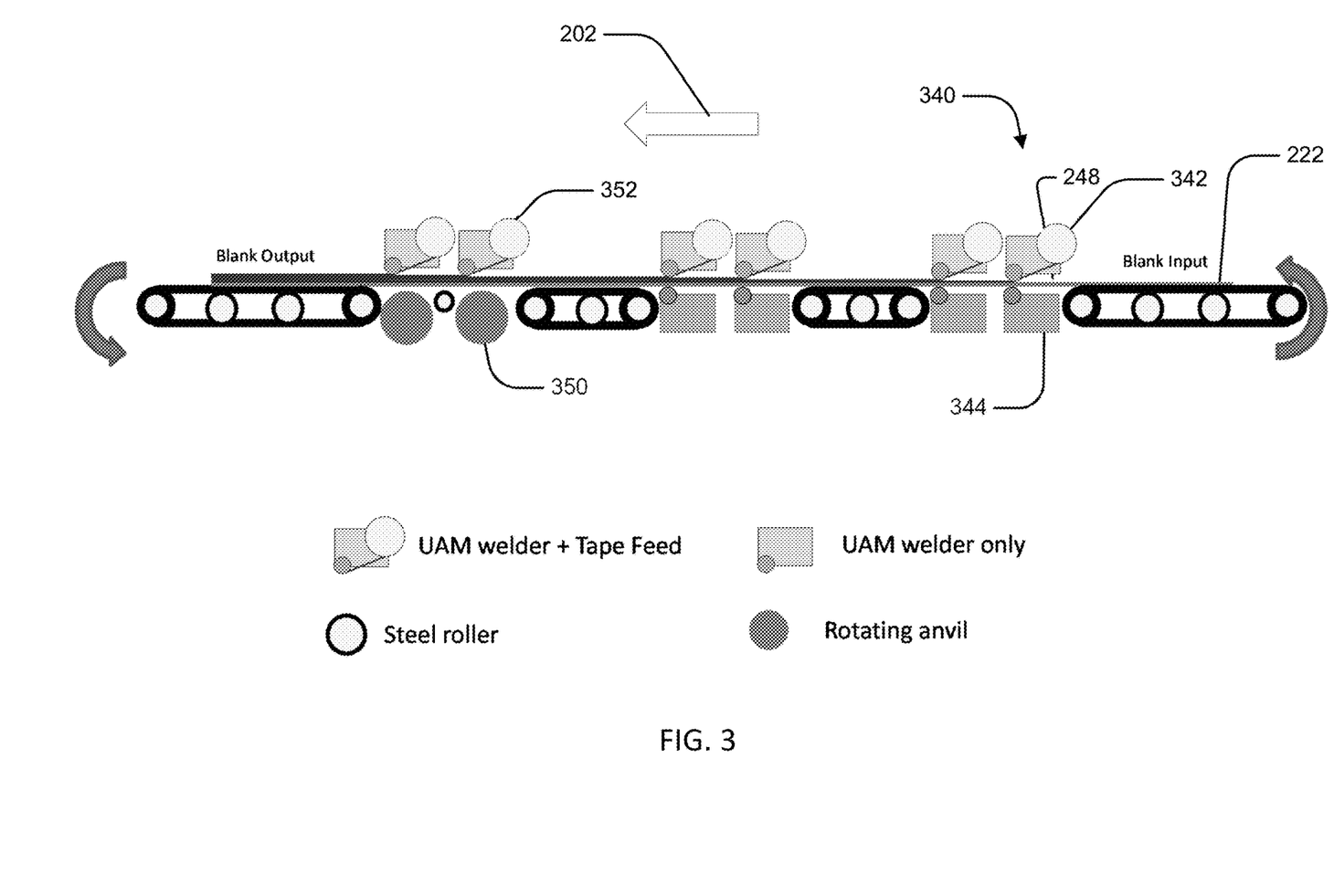
FIG. 3 illustrates another example system for continuously manufacturing transition structures, according to an aspect of the disclosure.

In one example, shown in FIG. 3, a double welder 340 may include a first ultrasonic welding device 342 on a first side of the workpiece (e.g., in contact with the metallic foil 248) and a second ultrasonic welding device 344 on a second side of the workpiece directly opposite the first ultrasonic welding device 342 (e.g., in contact with the base material 222). The base material 222 (e.g., blank input) may be fed continuously between the first ultrasonic welding device 342 and second ultrasonic welding device 344. For example, as shown in FIG. 3, a conveyor 210 may move the blank input to the dual welder 346, and the dual welder 346 may carry the workpiece to a second conveyor. In an aspect, the ultrasonic welding devices 342, 344, may be driven out of phase (amplitude wise). Driving the separate ultrasonic welding devices 342, 344 out of phase may potentially use less power per weld head. The double welder 340 may include multiple sets of a first ultrasonic welding device 342 and second ultrasonic welding device 344, for example, to produce wider or thicker layers.

In another aspect, a roller-type anvil 350 may be positioned opposite an ultrasonic welding device 352. A coating may be applied to the roller-type anvil and/or the sonotrode of the ultrasonic welding device 352 to prevent the workpiece from sticking (e.g., becoming welded) to the roller-type anvil 350. A thicker material, such as the baseplate relative to the foil, will allow for more ultrasonic energy to be dissipated by the bulk shear stresses, meaning that welding to the anvil is less likely than welding to the sonotrode. A larger anvil surface area may also make welding to the anvil less likely than welding to the sonotrode. If the bottom of the composite workpiece is aluminum and the reinforcement is steel, for example, an uncoated steel roller anvil may not weld to the bottom of the workpiece, but a steel horn/sonotrodes will likely need a coating to prevent welding to the steel reinforcement.

The coating may be a surface treatment including a material that is different than the sonotrode of the ultrasonic welding device 352. The coating may be a solid layer with a thickness between 5 microns and 500 microns. The coating may be applied via physical vapor deposition, chemical vapor deposition, thermal spray, cold spray, sputtering, electrodeposition, or other methods. The coating may include a ceramic, metal, cermet, or metal matrix composite containing hard materials such as cubic boron nitride, tungsten carbide, diamond, TiN, TiAlN, TiCN, CrN or other suitably hard materials with low affinity for the materials being joined. As an alternative, the sonotrode may be hardened via carburizing or nitriding.

Figure 4A:
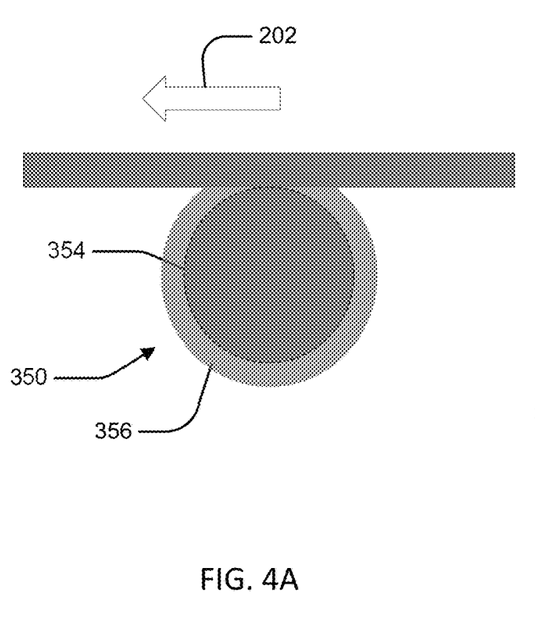
FIG. 4A illustrates a side view of an example roller-type anvil, according to an aspect of the disclosure.
Figure 4B:
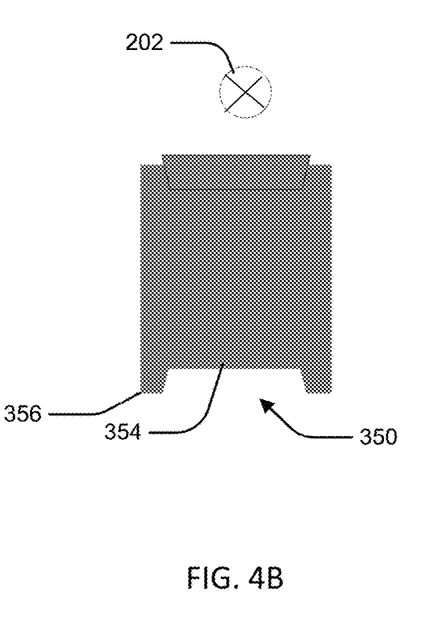
FIG. 4B illustrates a front view of the example roller-type anvil of FIG. 4A.

An example roller-type anvil 350 is illustrated in FIGS. 4A and 4B. The roller-type anvil 350 may include a central surface 354 that supports the base material against the sonotrode (horn) of the ultrasonic welding device 352 and side constraints 356 that contrain the base stock again movement transverse to the production direction (into the page for FIG. 4B). It should be appreciated that a system 200 may include any combination of conveyor belts, double welders, and roller-type anvils.

Figure 5:
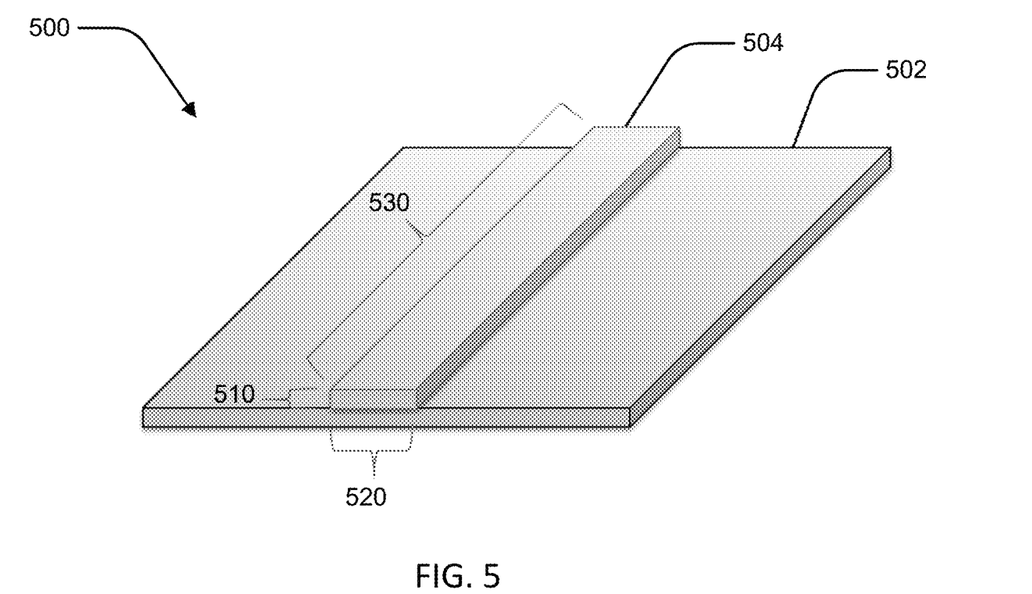
FIG. 5 illustrates an example UAM reinforced component including a base component and a metallic reinforcement according to an aspect of the disclosure.

FIG. 5 illustrates an example UAM reinforced component 500 including a base component 502 and a metallic reinforcement 504. The both the base component 502 and the metallic reinforcement 504 may be formed of any metal or combination of metals compatible with the techniques disclosed herein, such as, for example, steel, aluminum, magnesium, titanium, cobalt, beryllium, nickel, columbium, tantalum, tungsten, and alloys thereof, or other structural alloys. In the illustrated example, the base component 302 may be a metallic blank to be processed into a more specific component after being reinforced. However, UAM reinforcement may be used on other components, for example, components with flat metallic surfaces.

The metallic reinforcement 504 may have dimensions that affect manufacturing systems and methods. The metallic reinforcement 504 may have a thickness 510. The thickness 510 may be related to a thickness and number of layers of metallic foil that are ultrasonically welded. The metallic reinforcement 504 may have a width 520. In an aspect, the metallic reinforcement 504 may have a width 520 that is limited to the maximum width of a UAM apparatus. In another aspect, metallic reinforcement 504 may use multiple UAM heads arranged to consolidate parallel tapes to produce a width 520 greater than a maximum width of a single UAM head. The metallic reinforcement 504 may have a length 530. The length 530 may be selected based on the needs of the UAM reinforced component 500.

Figure 6:
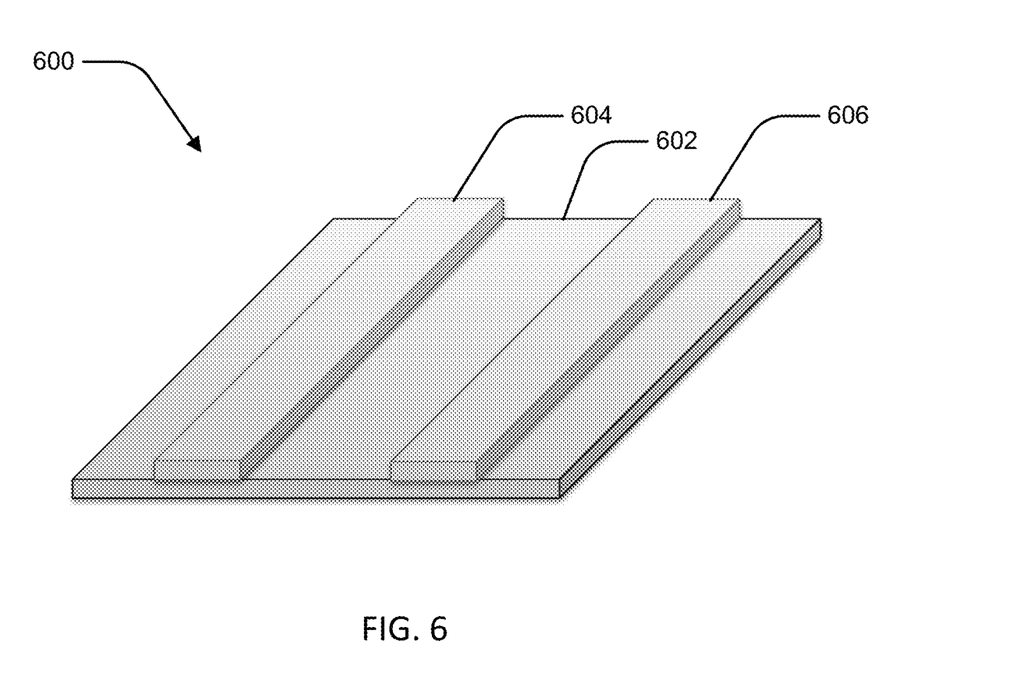
FIG. 6 illustrates an example UAM reinforced component including a base component and multiple metallic reinforcements according to an aspect of the disclosure.

FIG. 6 illustrates another example UAM reinforced component 600. The UAM reinforced component 600 may include a base component 602 and two or more metallic reinforcements 604, 606. As discussed in further detail below, multiple metallic reinforcements 604, 606 may be produced by multiple UAM heads arranged in parallel or staggered along a production direction.

Figure 7:
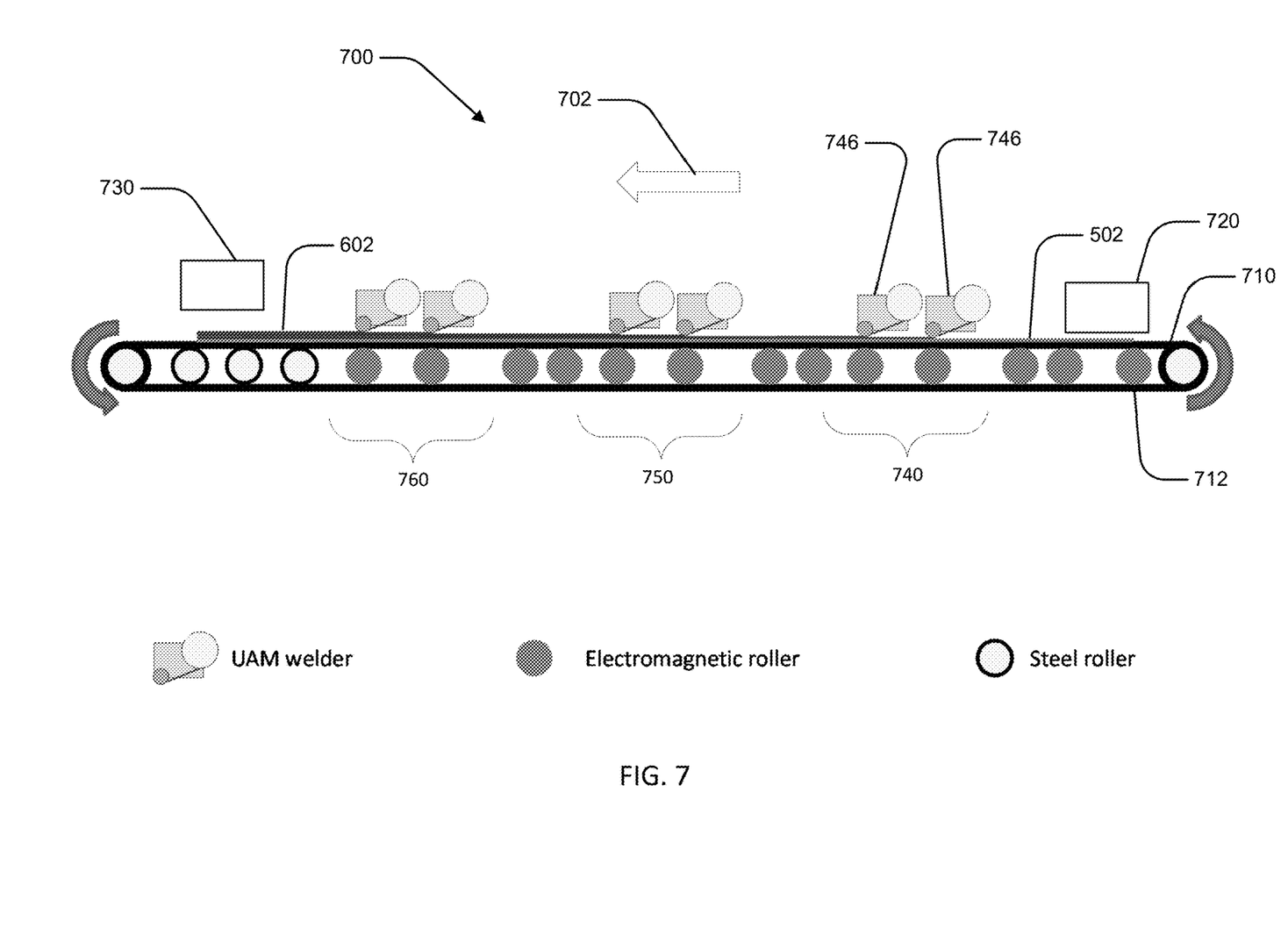
FIG. 7 illustrates an example system for continuously manufacturing UAM reinforced components according to an aspect of the disclosure

FIG. 7 illustrates an example system 700 for manufacturing UAM products such as UAM reinforced components 500, 600. The system 700 may include a conveyor 710 to advance base materials in the production direction 702. The system 700 may also include a base material supply 720, and a collection device 730. The conveyor 710 may be similar to the conveyor 210 and include a plurality of rollers 712 including electromagnetic rollers and/or steel rollers. The base material supply 720 may be similar to the base material supply 220 and may supply base components 502. For example, the base material supply 720 may position base components 502 on the conveyor 710. The collection device 730 may be similar to the collection device 230 and may collect completed UAM reinforced components 500, 600. Similar to the system 200, the system 700 may include machines arranged into stages 740, 750, 760 for performing operations on the base component 502, 602. For example, as illustrated, the first stage 740 may include multiple UAM heads 746 for consolidating a tape of metallic foil to the base component 502, 602.

Figure 8:
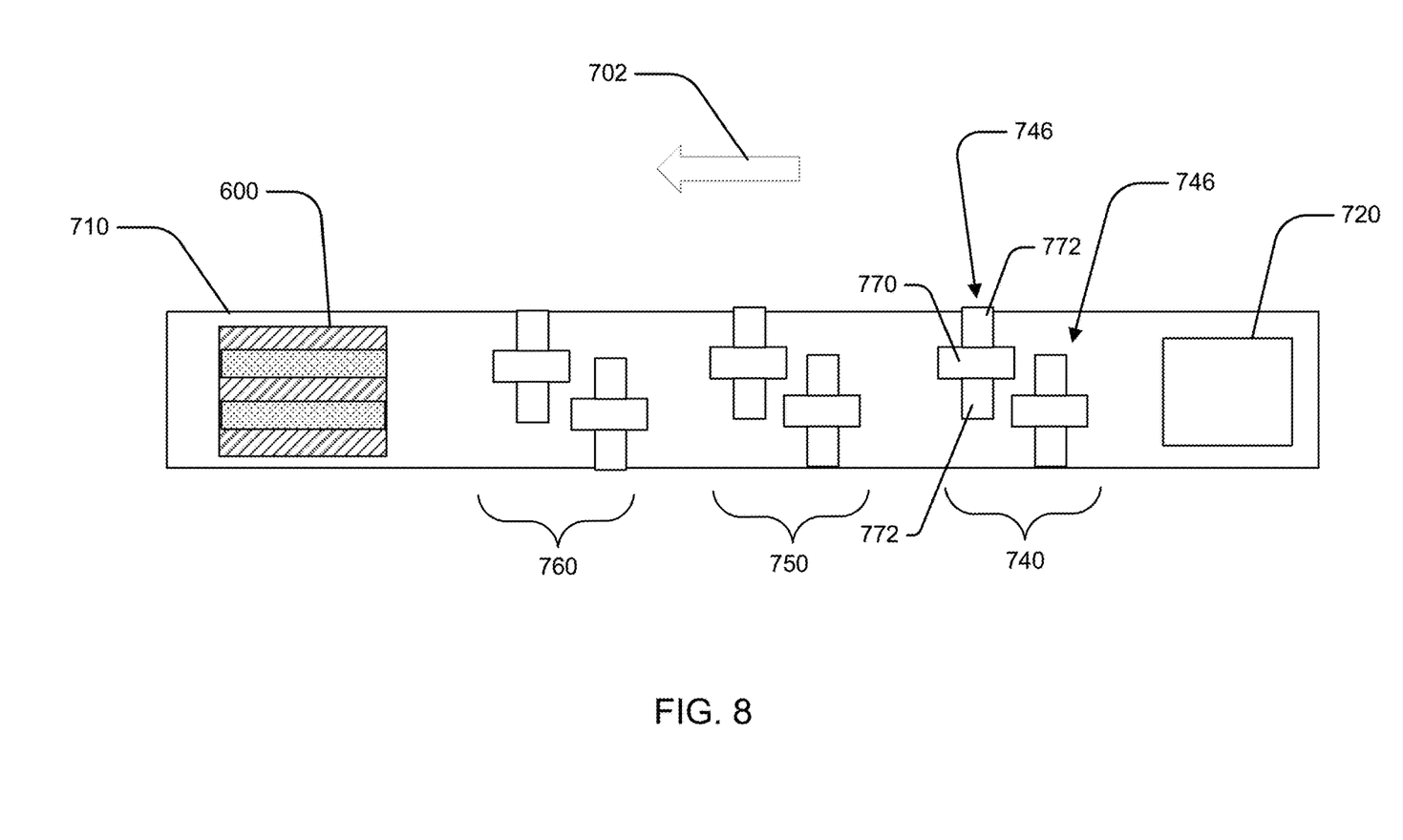
FIG. 8 illustrates a top view of the example system of FIG. 7.

FIG. 8 illustrates a top view of the example system 700 for producing the UAM reinforced component 600. Each UAM head 746 may include a horn 770 and one or more transducers 772. The horn 770 may contact the metallic tape to consolidate the metallic tape to the base component 602. The transducers 772 may extend laterally from the horn. Accordingly, when the UAM reinforced component 600 includes multiple metallic reinforcements 604, 606, the UAM heads 746 may be staggered in each stage 740, 750, 760 in the production direction 702. Similarly, when a UAM transition structure 100 has a width 120 greater than the maximum width of a UAM head 746, the UAM heads may be staggered to produce a wider transition structure using adjacent metallic tapes.

Figure 9:
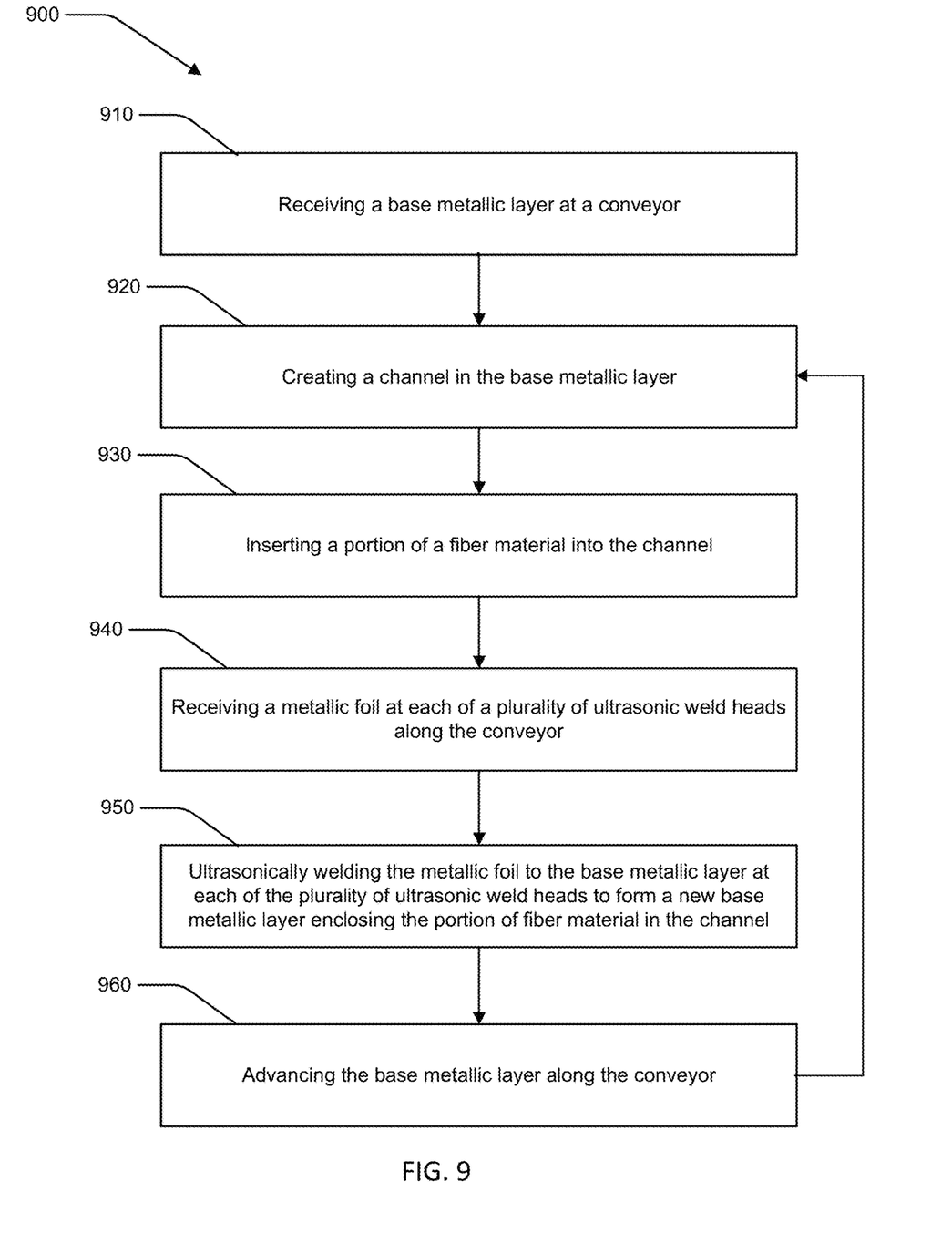
FIG. 9 illustrates a flowchart showing an example method for continuously manufacturing transition structures according to an aspect of the disclosure.

FIG. 9 is a flowchart of an example method 900 of manufacturing a transition structure. The method 900 may be performed by the system 200.

In block 910, the method 900 may include receiving a base metallic layer at a conveyor. In an aspect, for example, the conveyor 210 may receive the base material 222 from the base material supply 220.

In block 920, the method 900 may include creating a channel in the base metallic layer. In an aspect, for example, the channel forming device 242 may create a channel in the base material 222. Creating a channel may include cutting, machining, forming, or ablating the base material 222 to create the channel. For example, cutting or machining channels may be accomplished with an endmill and CNC machining head. This is potentially the slowest operation if the channel sizes are small and/or have geometric features that require lateral motion of the CNC head not in the direction of the conveyor system. As another example, forming channels may be accomplished with a die that has a negative of the desired channel shape machined into it. The die may be cylindrical, allowing it to roll along the surface of the workpiece to continuously imprint the channel geometry as the workpiece moves on the conveyor. This method has potential to be very rapid with the benefit of not producing any chips or scrap metal and potentially inducing cold work to the part, increasing its strength. Forming may not be suitable for some harder or higher strength base materials. As another example, ablating the workpiece to form channels can be accomplished with a laser, melting or sublimating base material along a programmed path. This has the potential to be the fastest of the listed methods, and is somewhat insensitive to geometric features. The primary challenge of ablation is making wide channels without cutting too deep into the material.

In block 930, the method 900 may include inserting a portion of a fiber material into the channel. In an aspect, for example, the fiber insertion device 244 may insert the portion of the fiber material into the channel.

In block 940, the method 900 may include receiving a metallic foil at each of a plurality of ultrasonic weld heads along the conveyor. In an aspect, for example, each of the plurality of ultrasonic welding devices 246 may receive the metallic foil 248. For example, the metallic foil 248 may be fed to the ultrasonic weld head via a spool.

In block 950, the method 900 may include ultrasonically welding the metallic foil to the base metallic layer at each of the plurality of ultrasonic weld heads to form a new base metallic layer enclosing the portion of fiber material in the channel. In an aspect, for example, each of the plurality of ultrasonic welding devices 246 may ultrasonically weld the respective metallic foil 248 to the base material 222 as the base material 222 moves along the conveyor 210, thereby enclosing the portion of fiber material in the channel.

In block 960, the method 900 may include advancing the base metallic layer along the conveyor. In an aspect, for example, the conveyor 210 may advance the base material 222 along the conveyor 210.

Figure 10:
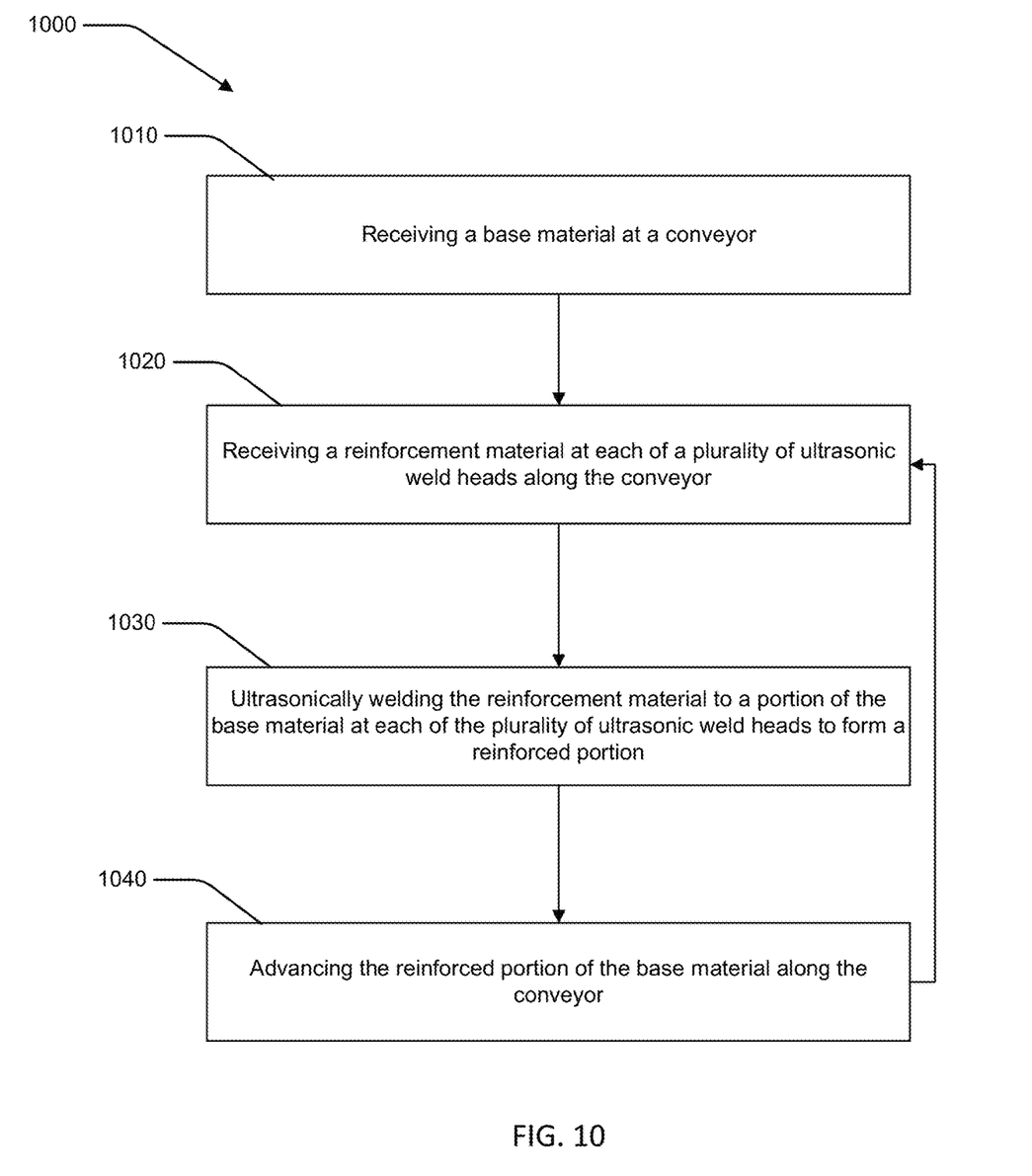
FIG. 10 illustrates a flowchart showing an example method for continuously manufacturing UAM reinforced components according to an aspect of the disclosure.

FIG. 10 is a flowchart of an example method 1000 of manufacturing a UAM reinforced component (e.g., UAM reinforced components 500, 600). The method 1000 may be performed by the system 700.

At block 1010, the method 1000 may include receiving a base material at a conveyor. In an aspect, for example, the conveyor 710 may receive a base material (e.g., base component 502, 602) from the base material supply 720.

At block 1020, the method 1000 may include receiving a reinforcement material at each of a plurality of ultrasonic weld heads along the conveyor. In an aspect, for example, each of the UAM heads 746 may receive the reinforcement material. The reinforcement material may be, for example, a metal, metal-fiber composite, or any other high strength material that can be welded using a UAM process. In an aspect, different reinforcement materials may be provided to different ultrasonic welding heads. The different reinforcement materials may be applied to different reinforced portions, or the different reinforcement materials may be consolidated in different layers of the same reinforced portion.

At block 1030, the method 1000 may include ultrasonically welding the reinforcement material to a portion of the base material at each of the plurality of ultrasonic weld heads to form a reinforced portion. In an aspect, for example, each of the UAM heads 746 may ultrasonically weld the reinforcement material to a portion of the base material to form a reinforced portion.

At block 1040, the method 1000 may include advancing the reinforced portion of the base material along the conveyor. In an aspect, for example, the conveyor 710 may advance the reinforced portion of the base material along the conveyor.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for manufacturing transition structures including fiber threads embedded within a metal component, the system comprising:
   a supply of base sheet metal; and
   a conveyor supported on a plurality of rollers and configured to move the base sheet metal in a production direction;
   a plurality of stages arranged in the production direction, each stage comprising:
      a channel forming device configured to create a channel in the base sheet metal;
      a fiber inserting device configured to insert a portion of a fiber material into the channel; and
      one or more ultrasonic welders configured to consolidate a layer of metal foil to the base sheet metal over the portion to embed the fiber material in the base sheet metal.

2. The system of claim 1, wherein a roller of the plurality of rollers is positioned along the conveyor opposite each of the one or more ultrasonic welders.

3. The system of claim 2, wherein the roller includes a central support surface and side constraints that constrain the base sheet metal against movement transverse to the production direction.

4. The system of claim 1, wherein the one or more ultrasonic welders comprises a first ultrasonic welder in contact with the layer of metal foil and a second ultrasonic welder positioned opposite the first ultrasonic welder, wherein the second ultrasonic welder is driven out of phase, amplitude wise, with the first ultrasonic welder.

5. The system of claim 1, wherein at least one stage of the plurality of stages is configured to insert a portion of fiber material or consolidate a layer of metal foil having a different composition than the base sheet metal or a previously inserted fiber material or consolidated layer of metal.

6. A method of manufacturing transition structures including fiber threads embedded within a metal component, the method comprising:
   receiving, from a supply of base sheet metal, a base metallic layer at a conveyor supported on a plurality of rollers and configured to move the base sheet metal in a production direction;
   creating, by a channel forming device, a channel in the base metallic layer;
   inserting, by a fiber inserting device, a portion of a fiber material into the channel;
   receiving a metallic foil at each of a plurality of ultrasonic weld heads along the conveyor;
   ultrasonically welding the metallic foil to the base metallic layer over the portion at each of the plurality of ultrasonic weld heads to form a new base metallic layer enclosing the portion of the fiber material in the channel; and
   advancing the base metallic layer along the conveyor, wherein the creating, inserting, receiving, an ultrasonically welding are performed at a plurality of stages arranged in the production direction.

7. The method of claim 6, further comprising:
creating a second channel in the new base metallic layer;
inserting a second portion of a fiber material into the second channel;
receiving a second metallic foil at each of a second plurality of ultrasonic weld heads along the conveyor;
ultrasonically welding the second metallic foil to the base metallic layer at each of the plurality of ultrasonic weld heads to form a new base metallic layer enclosing the portion of fiber material in the channel; and
advancing the base metallic layer along the conveyor.

\* \* \* \* \*